Figure 1:
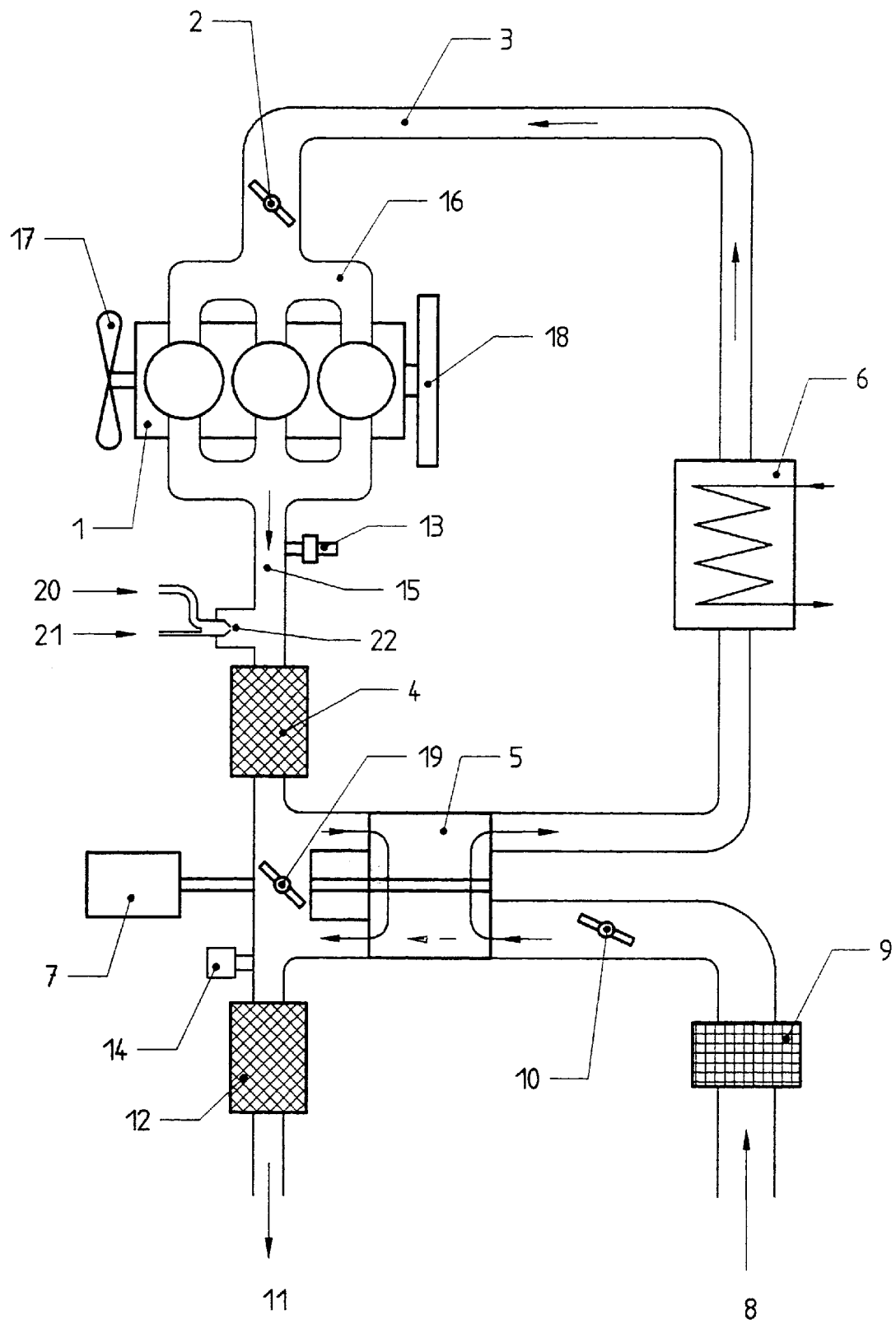

United States Patent
Wenger

[19]

[11] Patent Number: 6,089,211
[45] Date of Patent: Jul. 18, 2000

[54] SPARK IGNITION ENGINE WITH PRESSURE-WAVE SUPERCHARGER

[75] Inventor: Urs Wenger, Langenthal, Switzerland

[73] Assignee: Swissauto Engineering S.A., Switzerland

[21] Appl. No.: 09/142,106

[22] PCT Filed: Mar. 3, 1997

[86] PCT No.: PCT/CH97/00079

§ 371 Date: Sep. 1, 1998

§ 102(e) Date: Sep. 1, 1998

[87] PCT Pub. No.: WO97/33080

PCT Pub. Date: Sep. 12, 1997

[30] Foreign Application Priority Data

Mar. 5, 1996 [EP] European Pat. Off. ............. 96810128

[51] Int. Cl.$^7$ .................................................. F02B 33/42
[52] U.S. Cl. .......................................... 123/559.2; 60/280
[58] Field of Search ........................... 123/559.2; 60/274, 60/280

[56] References Cited

U.S. PATENT DOCUMENTS 4,553,387  11/1985  Mayer .
4,702,075  10/1987  Jenny .
5,709,081   1/1998  Bruestle ................................ 60/274

FOREIGN PATENT DOCUMENTS

| 0415128 | 3/1991 | European Pat. Off. . |
| 3732301 | 5/1989 | Germany . |
| 52-44324 | 4/1977 | Japan ..................................... 60/280 |
| 60-159337 | 8/1985 | Japan . |
| 62-020614 | 1/1987 | Japan . |
| 62-20630 | 1/1987 | Japan ................................. 123/559.2 |
| 62-159717 | 7/1987 | Japan . |
| 4-094420 | 3/1992 | Japan . |
| 6-200746 | 7/1994 | Japan . |

*Primary Examiner*—Michael Koczo
*Attorney, Agent, or Firm*—Ostrolenk, Faber, Gerb & Soffen, LLP

[57] ABSTRACT

The invention relates to a spark ignition engine (1) having a pressure-wave supercharger (5) and a three-way catalyst (4). To remove the pollutant constituents HC, CO and $NO_x$ in an efficient manner, an oxidation catalyst (12) is connected downstream of the three-way catalyst, said oxidation catalyst being arranged between the outlet of the supercharger and the exhaust (11). The oxidation catalyst can, consequently, function with excess air which comes from the supercharger. The above combination reduces pollutants substantially with a high specific output of the engine.

9 Claims, 1 Drawing Sheet

SPARK IGNITION ENGINE WITH PRESSURE-WAVE SUPERCHARGER

Spark ignition engines have now been built for over 100 years, and they are constantly improved in view of an increased output and a reduced fuel consumption. However, as considerable improvements have already been realized, only a gradual reduction of the fuel consumption of conventional spark ignition engines is possible. Furthermore, intense efforts have been made recently to reduce the pollutant emissions, the corresponding exhaust gas cleaning systems using different catalysts of which the regulated three-way catalyst has been most successful as it allows a simultaneous conversion of the three principal pollutant constituents.

Pressure wave superchargers, where exhaust gas and air are momentarily brought into direct contact with each other in cells which are open on both sides, are known per se. Different companies have attempted to use pressure wave superchargers in the automobile construction, while most attempts were directed to an increase of the power output of the engine. As far as known, pressure wave superchargers have only been built in series in combination with diesel engines.

EP-A-0 415 128 discloses an engine according to the preamble of claim 1, and it is suggested to minimize the aging process of a catalyst in an internal combustion engine having a pressure wave supercharger by the fact that the catalyst is disposed near the engine and cooled by the charge air.

From the Patent Abstracts of Japan, Vol. 11, No. 392 (M-653), Dec. 22, 1987 & JP-A-62-159 717, a supercharged engine is known at the outlet of which a three-way catalyst is provided which is only activated at slow speed.

DE-C-37 32 301 discloses a device for the purification of the exhaust gas of an internal combustion engine wherein a three-way catalyst is used which is followed by an oxidation catalyst. The temperature increase in the oxidation catalyst is measured and used for a feedback regulation.

On the background of this prior art, it is the object of the present invention to provide a spark ignition engine which allows both a substantially increased specific output and a substantially reduced pollutant emission. This object is attained by the spark ignition engine according to claim 1, which discloses a combination of a spark ignition engine with a pressure wave supercharger, a three-way catalyst, and an additional oxidation catalyst.

Further characteristic features and advantages, as well as means allowing to prevent disadvantages in cold start conditions, in particular, are defined in the dependent claims.

The invention is explained in more detail hereinafter with reference to a drawing of an embodiment. The single FIGURE schematically shows a spark ignition engine according to the invention with an effective exhaust gas cleaning system.

The single FIGURE illustrates the spark ignition engine 1, i.e. an internal combustion engine, a throttle 2 in inlet channel 3, and a three-way catalyst 4 in outlet 15. The engine, which may be any known internal combustion engine such as an automobile or an aircraft engine and whose fan 17 and output 18 are illustrated, and three-way catalyst 4 form a conventional spark ignition engine according to the prior art as described in the introduction.

This conventional spark ignition engine is completed by a pressure wave supercharger 5 which is preferably operated with a charge air cooler 6 in the inlet channel and comprises an electric or mechanical drive 7, as the case may be, which may also be omitted, however, if the pressure wave supercharger is suitably shaped and dimensioned. Air inlet 8 contains an air filter 9 and—in contrast to known pressure wave supercharger systems—a charger throttle 10. Exhaust 11 comprises a second catalyst in the form of an oxidation catalyst 12. The control of the catalysts is effected by lambda probe 13, temperature probe 14, and by the so-called wastegate flap 19.

The arrows in the channels indicate the course of the air and gas flows, and this schematic view shows that the fresh air is taken in at air inlet 8 and supplied to pressure wave supercharger 5 via air filter 9 and charger throttle 10. In the pressure wave supercharger, the major part of the fresh air is compressed under the action of the exhaust gases and supplied to internal combustion engine 1 via charge air cooler 6 and throttle 2. A small portion of the fresh air passes through pressure wave supercharger 5 in the form of scavenging air and is discharged into exhaust 11, where it mixes with the exhaust gases. From internal combustion engine 1, the exhaust gases pass through three-way catalyst 4 to pressure wave supercharger 5, where they are mixed with fresh air and subsequently discharged through oxidation catalyst 12 to exhaust 11.

Wastegate flap 19 may be opened in the case of an excessive charging pressure, so that a part of the exhaust gases is directed past pressure wave supercharger 5, thus resulting in a smaller pressure ratio. This allows to obtain a better overall efficiency of the driving unit and thus to reduce the fuel consumption. Instead of a wastegate flap, other means for the control of the charging pressure may be used which are known per se.

Charger throttle 10 serves for the control of the scavenging air. It allows to reduce the proportion of fresh air which passes to the exhaust. This results in an increase of the exhaust gas temperature at oxidation catalyst 12, so that the latter attains its starting temperature sooner and thus yields a higher conversion rate. The signal of temperature probe 14 may be used as a regulating variable for the control of the charger throttle. The engine speed and the pressure downstream of throttle 2 may serve as further control variables. Lambda probe 13 provides the regulating variable for the mixture control.

The engine is operated at a lambda ratio of 1 or with a slight fuel excess. It is generally acknowledged that a three-way catalyst in combination with an electronic mixture control (lambda probe) presently represents the most efficient catalytic exhaust gas cleaning system. It allows a simultaneous conversion of all three pollutant constituents but requires as precise a stoichiometric fuel-air mixture (lambda 1) as possible. The three constituents are HC, CO and $NO_x$. By shifting the control range lambda 1 to the richer side, the $NO_x$ constituents can be converted and eliminated very effectively. However, this would lead to a reduction of the conversion rate of the other two constituents and would therefore not be useful if merely a three-way catalyst is used.

The use of a pressure wave supercharger allows to increase the efficiency of the internal combustion engine and, due to the fact that the pressure wave supercharger produces an air excess in the exhaust system, allows the use of an oxidation catalyst at this point, whereby the remaining pollutants, which are mainly composed of HC and CO, can be optimally converted. Depending on the coating of the catalyst, a substantial $NO_x$ conversion rate can be obtained in the oxidation catalyst as well.

If the exhaust gas temperature at outlet 15 is low, e.g. in cold start conditions, the conversion rate of the catalyst is smaller, thus resulting in higher exhaust gas emissions.

Furthermore, as the exhaust gas temperatures decrease, the pressure wave process in the charger becomes more and more problematic, and the process can even be completely stopped in the extreme case. Consequently, only a reduced charging pressure can first be attained when the engine is cold, which leads to a reduced power of the engine.

The two problems can be counteracted by a burner 22 which is disposed between outlet 15 and three-way catalyst 4 and which is activated in the case of a low exhaust gas temperature. In this manner, on one hand, the catalyst is brought to its optimum operating temperature more quickly and, on the other hand, the gases reach the supercharger at a higher temperature. The pressure wave process is thus started while the engine is still cold, and the full power of the engine is available. FIG. 1 further illustrates air supply 20 and fuel supply 21 of burner 22.

Instead of a described burner 22, other heating devices may be used, e.g. an electrically operated heater. In this context it is important that both the function of the catalyst and that of the charger are advantageously influenced.

Accordingly, the combination of a spark ignition engine with a pressure wave supercharger allows an important increase in power and mainly also the application of a following oxidation catalyst which, on one hand, allows a more effective elimination of one of the pollutant constituents, namely $NO_x$, by the three-way catalyst than the conventional application of the three-way catalyst and, on the other hand, a particularly high conversion rate of the remaining pollutants HC and CO in the oxidation catalyst due to the air excess therein.

This system results in a considerable reduction of the pollutants as compared to conventional spark ignition engines. It is understood that in comparison to a conventional spark ignition engine of the same power, the application of a pressure wave supercharger allows the use of a smaller engine having a lower fuel consumption or of an engine having a smaller total weight while a considerably reduced pollutant emission is obtained.

What is claimed is:

1. An internal combustion engine system comprising:

an internal combustion engine having an inlet and an outlet:

a regulated three-way catalyst having an inlet and an outlet, the inlet of the three-way catalyst being coupled to the outlet of the internal combustion engine;

an air inlet;

an exhaust;

a pressure wave supercharger having an first inlet, a first outlet, a second inlet and a second outlet, the first inlet being coupled to the outlet of the three-way catalyst, the second inlet being coupled to the air inlet, and the second outlet being coupled to the inlet of the internal combustion engine; and an oxidation catalyst disposed between the first outlet of the pressure wave supercharger and the exhaust.

2. The internal combustion engine system according to claim 1, further comprising:

a charger throttle provided at the second inlet of the pressure wave supercharger in order to control the amount of scavenging air.

3. The internal combustion engine system according to claim 1, further comprising:

control means provided at the first outlet of the pressure wave supercharger in order to regulate the charging pressure.

4. The internal combustion engine system according to claim 3, wherein the control means include a wastegate flap.

5. The internal combustion engine system according to claim 1, wherein the pressure wave supercharger comprises:

a drive; and a cell rotor, wherein the drive stabilizes a speed of the cell rotor in the pressure wave supercharger.

6. The internal combustion engine system according to claim 1, further comprising:

a heating device disposed between the outlet of the engine and the three-way catalyst in order both to bring the three-way catalyst to its optimum operating temperature sooner and to allow a quicker operation of the pressure wave supercharger.

7. The internal combustion engine system according to claim 6, wherein the heating device is a burner comprising an air and a fuel supply.

8. The internal combustion engine system according to claim 5, wherein the drive is electrically driven.

9. The internal combustion engine system according to claim 5, wherein the drive is mechanically driven.

* * * * *